(12) United States Patent
Aller (10) Patent No.: US 12,241,242 B1
(45) Date of Patent: Mar. 4, 2025

(54) COMBINATION PLUMBING TRAP AND VENT KIT, SYSTEM, AND METHOD

(71) Applicant: Timothy Aller, Sycamore, OH (US)

(72) Inventor: Timothy Aller, Sycamore, OH (US)

( * ) Notice: Subject to any disclaimer, the term of this patent is extended or adjusted under 35 U.S.C. 154(b) by 0 days.

(21) Appl. No.: 18/826,289

(22) Filed: Sep. 6, 2024

(51) Int. Cl.
| | | |
|---|---|---|
| *E03C 1/284* | (2006.01) | |
| *E03C 1/122* | (2006.01) | |
| *F16K 24/06* | (2006.01) | |

(52) U.S. Cl.
CPC ............ *E03C 1/284* (2013.01); *E03C 1/1225* (2013.01); *F16K 24/06* (2013.01)

(58) Field of Classification Search
CPC ...... E03C 1/284; E03C 1/1225; E03C 1/1222; E03C 1/282; E03C 1/12; F16K 24/06; F16K 24/04
USPC ...................... 4/650, 653, 679, 681, 639–640
See application file for complete search history.

(56) References Cited

U.S. PATENT DOCUMENTS

| | | | | |
|---|---|---|---|---|
| 598,992 A * | 2/1898 | Hosford | ................... | E03C 1/284 248/354.3 |
| 2,651,382 A * | 9/1953 | Dileo | ...................... | E03C 1/282 210/454 |
| 2,852,034 A * | 9/1958 | Shames | ................... | F16L 55/07 137/216.2 |
| 3,107,682 A * | 10/1963 | Young | ..................... | E03C 1/295 137/895 |
| 3,605,132 A * | 9/1971 | Lineback | .................. | E03C 1/12 137/526 |
| 3,687,493 A * | 8/1972 | Lock | ..................... | F16L 15/003 411/548 |
| 4,185,654 A * | 1/1980 | Young | ..................... | E03C 1/122 137/216.2 |
| 6,813,787 B2 * | 11/2004 | Rosenberg | ............... | A47K 3/28 4/612 |
| 9,534,363 B2 * | 1/2017 | Williams | ................ | E03C 1/021 |
| 11,624,176 B1 * | 4/2023 | Chandler | ................ | E03C 1/184 285/125.1 |
| 12,042,104 B2 * | 7/2024 | Hung | ..................... | E03D 9/052 |
| 2009/0173396 A1 * | 7/2009 | Spadavecchia | ......... | E03C 1/122 137/357 |
| 2010/0032028 A1 * | 2/2010 | Trueb | ........................ | E03C 1/12 137/526 |
| 2013/0220439 A1 * | 8/2013 | Pitsch | ................... | E03C 1/0401 137/15.08 |
| 2014/0130251 A1 * | 5/2014 | Yu | ............................. | E03C 1/29 4/679 |

* cited by examiner

*Primary Examiner* — Craig J Price
*Assistant Examiner* — Andrew J Rost
(74) *Attorney, Agent, or Firm* — Jacob M. Ward; Ward Law Office LLC (57) ABSTRACT

A combination plumbing trap and vent assembly for retrofitting existing sink installations is disclosed. The assembly includes a J-bend pipe with an inlet for attachment to a sink and an outlet, a T-pipe with an inlet arm connected to the J-bend outlet, a valve arm, and an outlet arm for connection to a drain, and an air admittance valve (AAV) attached to the valve arm. The AAV allows air to enter the system when negative pressure develops, maintaining proper drainage without extensive modifications to existing structures. This assembly provides an effective solution for slow-draining sinks and compliance with modern plumbing codes, particularly in situations where traditional venting methods are impractical or cost-prohibitive.

6 Claims, 8 Drawing Sheets

combination plumbing trap and vent kit 100

T-pipe 112 inlet arm 114 elbowed end 116 valve arm 118 female and internally threaded end portion 120 outlet arm 122 air-admittance valve 124 male and externally threaded end portion 126

Instructions Set 128

Teflon Tape 130

J-bend pipe 106

J-bend inlet 108

J-bend outlet 110

*FIG. 8*

COMBINATION PLUMBING TRAP AND VENT KIT, SYSTEM, AND METHOD

FIELD

The present technology relates to plumbing systems and fixtures and, more particularly, to combination plumbing trap and vent assemblies for use with sinks.

INTRODUCTION

This section provides background information related to the present disclosure which is not necessarily prior art.

Plumbing systems in buildings typically include drain-waste-vent (DWV) systems to remove wastewater and militate against sewer gases from entering occupied spaces. An important component of these systems is the trap, which forms a water seal to block sewer gases while allowing wastewater to flow through.

Conventional plumbing traps come in various configurations, with S-traps and P-traps being among the most common. S-traps, while once widely used, have fallen out of favor and are now prohibited by many plumbing codes due to their tendency to siphon the water seal, potentially allowing sewer gases to enter the building. This siphoning action can occur when water drains rapidly, creating negative pressure that pulls water out of the trap.

P-traps, on the other hand, remain code-compliant when properly vented. However, venting a P-trap often requires running new vent lines through walls and ceilings to connect to the main vent stack. The P-trap also requires a length of straight pipe be arranged horizontally between the trap seal and a vertically-oriented DWV pipe that is typically routed through the roof of the structure. This can all be particularly challenging and costly in remodeling situations, especially when structural elements block access to the existing DWV system.

In scenarios where proper venting is difficult to achieve, slow-draining sinks can become a persistent problem. This issue not only causes inconvenience for users but can also lead to unsanitary conditions and potential damage to plumbing fixtures and surrounding areas. Traditional solutions often involve extensive modifications to existing structures, which can be both disruptive and expensive.

Air admittance valves (AAVs) have emerged as an alternative venting solution in certain situations. These devices allow air to enter the plumbing system when negative pressure develops, helping to maintain proper drainage. However, the use of AAVs is not universally accepted, and some local codes may restrict or prohibit their use.

There is a continuing need for an innovative plumbing solution that can address the limitations of conventional traps and venting systems. Desirably, such a solution would provide effective trapping and venting without requiring extensive modifications to existing structures, while also resolving issues like slow-draining sinks and ensuring compliance with modern plumbing codes. Additionally, an ideal solution would be versatile enough to retrofit existing installations, particularly in situations where traditional venting methods are impractical or cost-prohibitive.

SUMMARY

In concordance with the instant disclosure, an innovative plumbing solution that can address the limitations of conventional traps and venting systems, and which provides effective trapping and venting without requiring extensive modifications to existing structures, while also resolving issues like slow-draining sinks and ensuring compliance with modern plumbing codes, and which is versatile enough to retrofit existing installations, particularly in situations where traditional venting methods are impractical or cost-prohibitive, has surprisingly been discovered.

The present technology includes articles of manufacture, systems, and processes that relate to combination plumbing trap and vent assemblies for use with sinks, particularly for retrofitting existing plumbing installations.

In one embodiment, a combination plumbing trap and vent kit may comprise a J-bend pipe having a J-bend inlet and a J-bend outlet, a T-pipe having an inlet arm with an elbowed end, a valve arm, and an outlet arm, and an air-admittance valve (AAV). The valve arm of the T-pipe may have a female and internally threaded end configured to receive a male and externally threaded portion of the AAV. This configuration allows for a secure connection between the components and provides an efficient venting solution without the need for traditional roof vents.

In another embodiment, a combination plumbing trap and vent assembly for use with a pre-existing sink may include a J-bend pipe having a J-bend inlet and a J-bend outlet, a T-pipe having an inlet arm with an elbowed end, a valve arm, and an outlet arm, and an air-admittance valve (AAV). The J-bend inlet of the J-bend pipe may be configured for attachment to the sink, while the J-bend outlet may be attached to the elbowed end of the inlet arm of the T-pipe. The AAV may be attached to the valve arm of the T-pipe, and the outlet arm of the T-pipe may be configured for attachment to a drain. This assembly provides a comprehensive solution for both trapping and venting functions, making it suitable for renovation projects or upgrades to existing plumbing systems.

In yet another embodiment, a method of installing a combination plumbing trap and vent system for a pre-existing sink may involve providing a kit comprising a J-bend pipe, a T-pipe, and an air-admittance valve (AAV). The method may include attaching the J-bend inlet of the J-bend pipe to the sink, attaching the J-bend outlet to the elbowed end of the inlet arm of the T-pipe, attaching the AAV to the valve arm of the T-pipe, and attaching the outlet arm of the T-pipe to a drain. This method allows for the efficient installation of a properly vented plumbing system, particularly in situations where traditional venting methods may be impractical or costly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves plumbing installations by providing a novel combination plumbing trap and vent assembly that addresses common issues in existing sink setups. This innovative solution enhances the functionality of conventional plumbing systems by offering an effective alternative to problematic S-traps and situations where proper venting is challenging to implement. The technology particularly excels in retrofitting scenarios, where it can effectively resolve slow-draining sink problems without the need for extensive modifications to the existing drain-waste-vent system. By incorporating an air-admittance valve (AAV) into its design, the present technology improves ventilation and militates against sewer gas intrusion, thereby enhancing both the performance and safety of sink plumbing installations.

Figure 1:
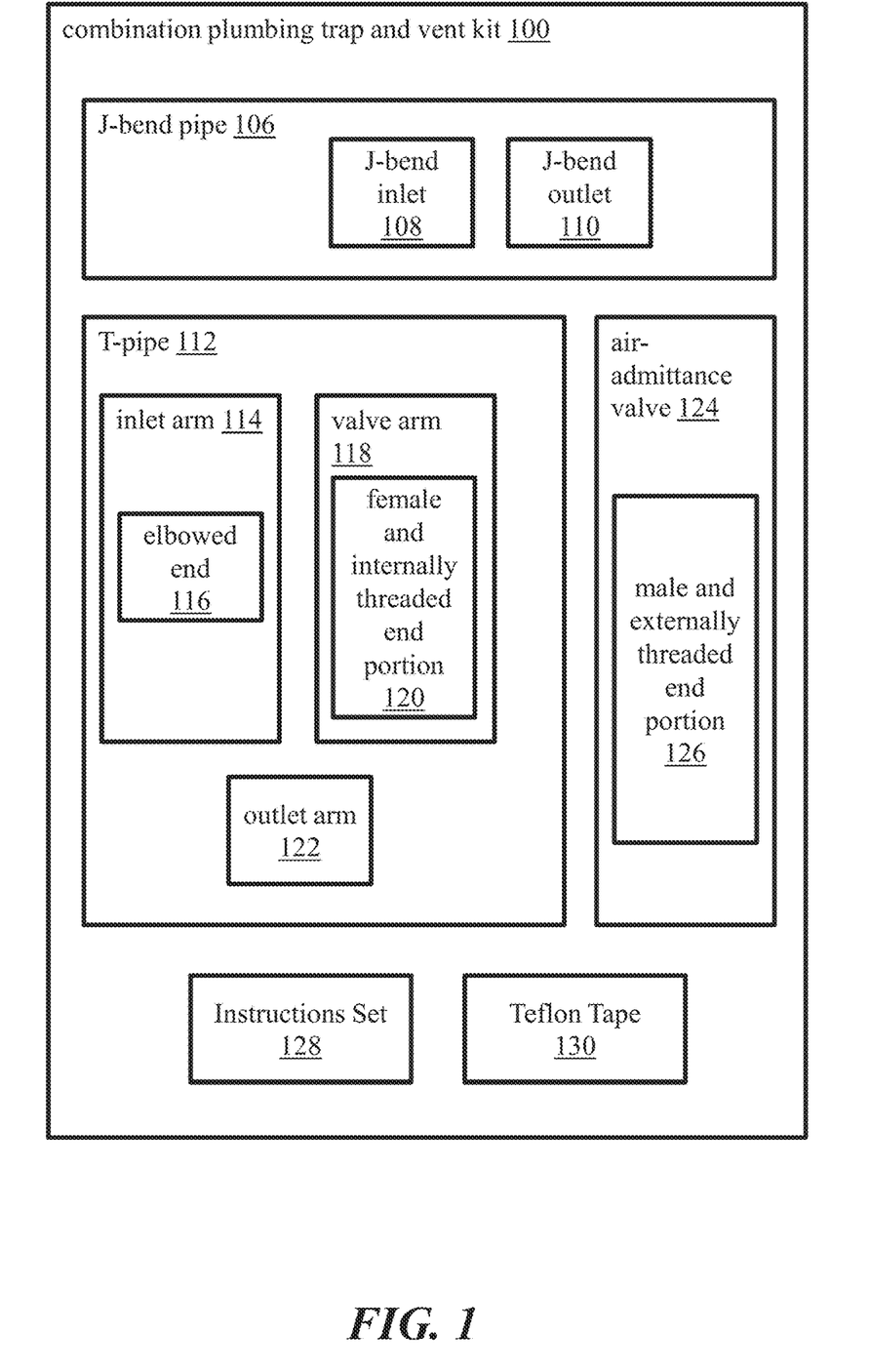
FIG. 1 is a block diagram illustrating a combination plumbing trap and vent kit, according to some embodiments of the present disclosure.
Figure 8:
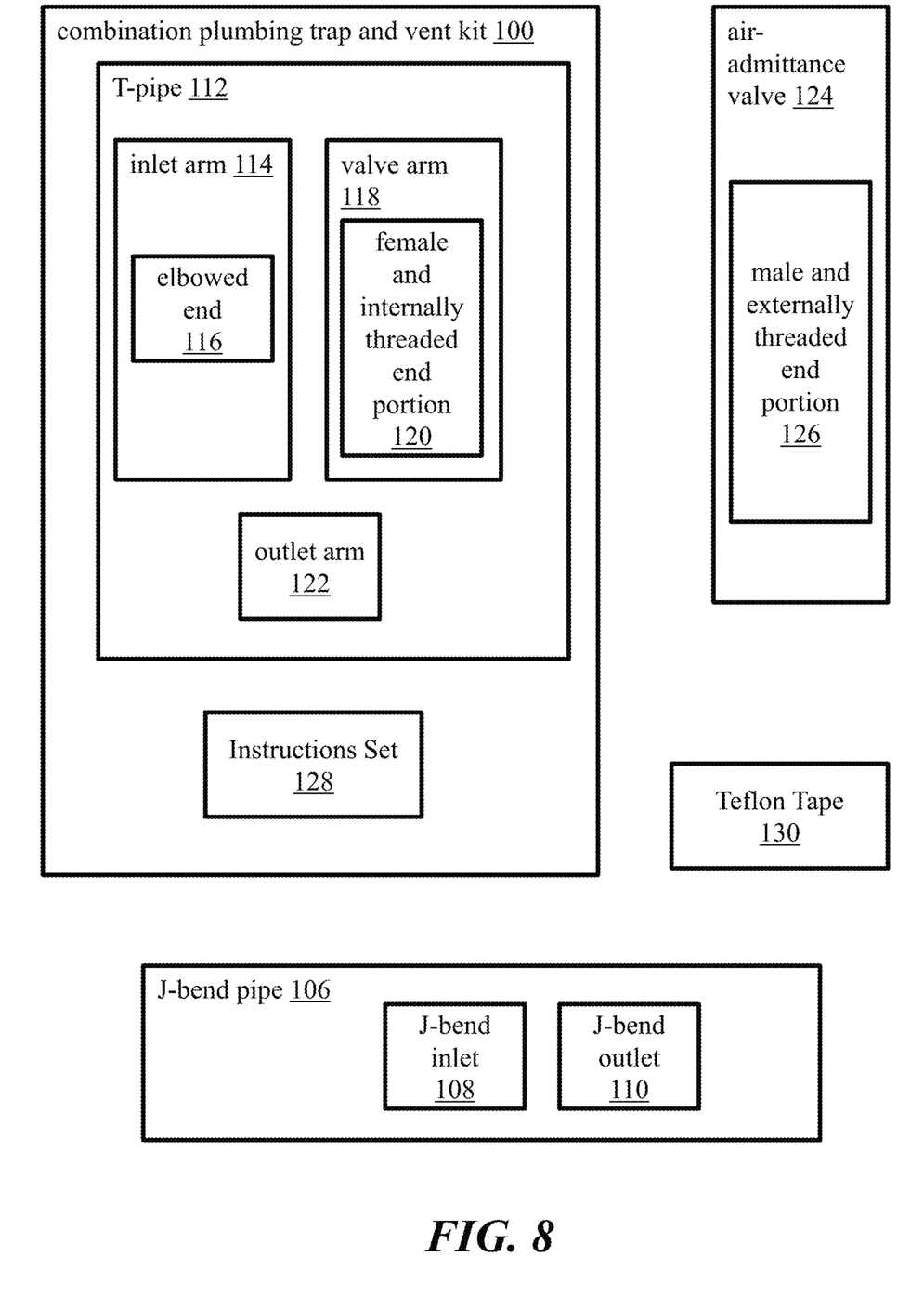
FIG. 8 is a block diagram illustrating a combination plumbing trap and vent kit, according to a particular embodiment of the present disclosure.

As shown in FIG. 1 and FIG. 8, embodiments of the present disclosure may include a combination plumbing trap and vent kit 100. The kit 100 may be especially adapted for use with a pre-existing sink 102 and a pre-existing drain 104 at the location of the pre-existing sink 102 (shown in FIGS. 2 and 5). However, the kit 100 may also be employed for other suitable uses by one skilled in the art, and these other uses are also contemplated and considered to be within the scope of the present disclosure.

With continued reference to FIG. 1, the kit 100 of the present disclosure may include a J-bend pipe 106 having a J-bend inlet 108 and a J-bend outlet 110. The J-bend pipe 106 may be configured to connect to existing plumbing fixtures and provide a water seal to militate against sewer gases from entering the living space. The kit 100 may also include a T-pipe 112 having an inlet arm 114 with an elbowed end 116, a valve arm 118, and an outlet arm 122.

The valve arm 118 of the T-pipe 112 may have a female and internally threaded end portion 120. This female and internally threaded end portion 120 may be specifically designed to receive a male and externally threaded end portion 126 of an air-admittance valve or AAV 124. The AAV 124 may be a helpful component of the kit 100, allowing for proper venting of the plumbing system without the need for traditional roof vents.

The J-bend inlet 108 of the J-bend pipe 106 may be configured for attachment to a sink. This configuration allows for easy integration of the kit 100 with existing plumbing fixtures, making it suitable for both new installations and retrofitting existing systems. The J-bend outlet 110 of the J-bend pipe 106 may be configured for attachment to the elbowed end 116 of the inlet arm 114 of the T-pipe 112, facilitating a seamless connection between the J-bend pipe 106 and the T-pipe 112.

Figure 5:
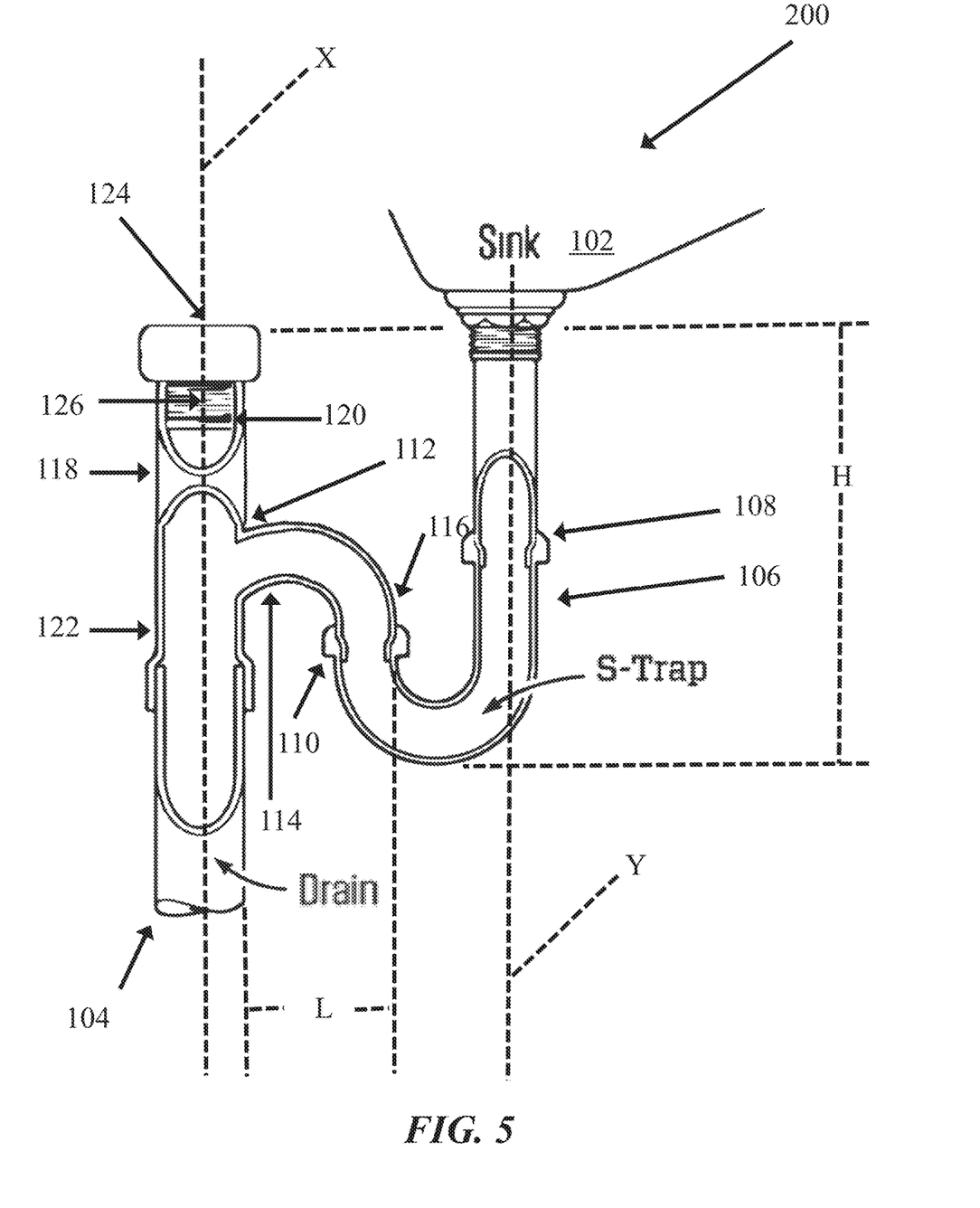
FIG. 5 is side elevational view of a combination plumbing trap and kit system according to one embodiment of the present disclosure, with portions removed to show underlying structure and connection of the parts of the kit.

In some embodiments, as shown in FIG. 5, the outlet arm 122 of the T-pipe 112 may be configured for attachment to a drain. This configuration allows for proper drainage of water from the plumbing system, ensuring efficient waste removal. The female and internally threaded end portion 120 of the valve arm 118 of the T-pipe 112 may have a 1½ inch inner diameter, providing a standard size for compatibility with common plumbing components. One or ordinary skill in the art may also select other suitable inner diameters for the valve arm 118 of the T-pipe, as desired.

As an illustrative example, in a commercial restroom renovation, the outlet arm 122 of the T-pipe 112 may be connected to the existing drain pipe in the wall. Likewise, the AAV 124 may be provided with a 1½ inch outer diameter and have the male and externally threaded end portion 126 specifically to ensure compatibility with the AAV 124. This allows for easy installation and potential future replacements without the need for custom fittings or adapters. This dimension also ensures a secure and leak-proof connection. The standardized sizing of these components may contribute to the ease of installation and compatibility with existing plumbing systems. This may also allow the user to easily connect these components without the need for specialized tools or adapters, simplifying the installation process and reducing the potential for errors.

The AAV 124 may be a gravity-operated vent device, allowing for efficient and automatic operation. This type of valve may respond to pressure changes within the plumbing system without the need for external power or manual intervention. The gravity-operated mechanism may contribute to the reliability and longevity of the venting system.

As an illustrative example, the AAV 124 that is gravity-operated may be installed in the kitchen sink plumbing of each unit. As water drains from a sink on an upper floor, the negative pressure created may automatically open the AAV 124, allowing air to enter the system and facilitate proper drainage. Once the water has finished draining, the valve may close by gravity, militating against any sewer gases from entering the living space. This automatic operation may ensure consistent and reliable venting across all units in the building without the need for complex mechanical systems or regular maintenance.

In some embodiments, the AAV 124 may be configured to open in response to negative pressure of draining water. This feature allows air to enter the plumbing system when needed, militating against the formation of a vacuum that could impede proper drainage. The ability of the AAV 124 to respond to pressure changes may help maintain the efficiency of the plumbing system. For example, this responsive action may ensure that each fixture drains efficiently, even during peak usage times, without causing gurgling sounds or slow drainage that could otherwise occur in a poorly vented system.

In some embodiments, the AAV 124 may be pre-installed with the T-pipe 112. This pre-installation can simplify the assembly process for the end-user and ensure proper placement of the AAV 124 within the plumbing system. The pre-installation may also reduce the risk of improper installation, which could compromise the functionality of the venting system.

Figure 2:
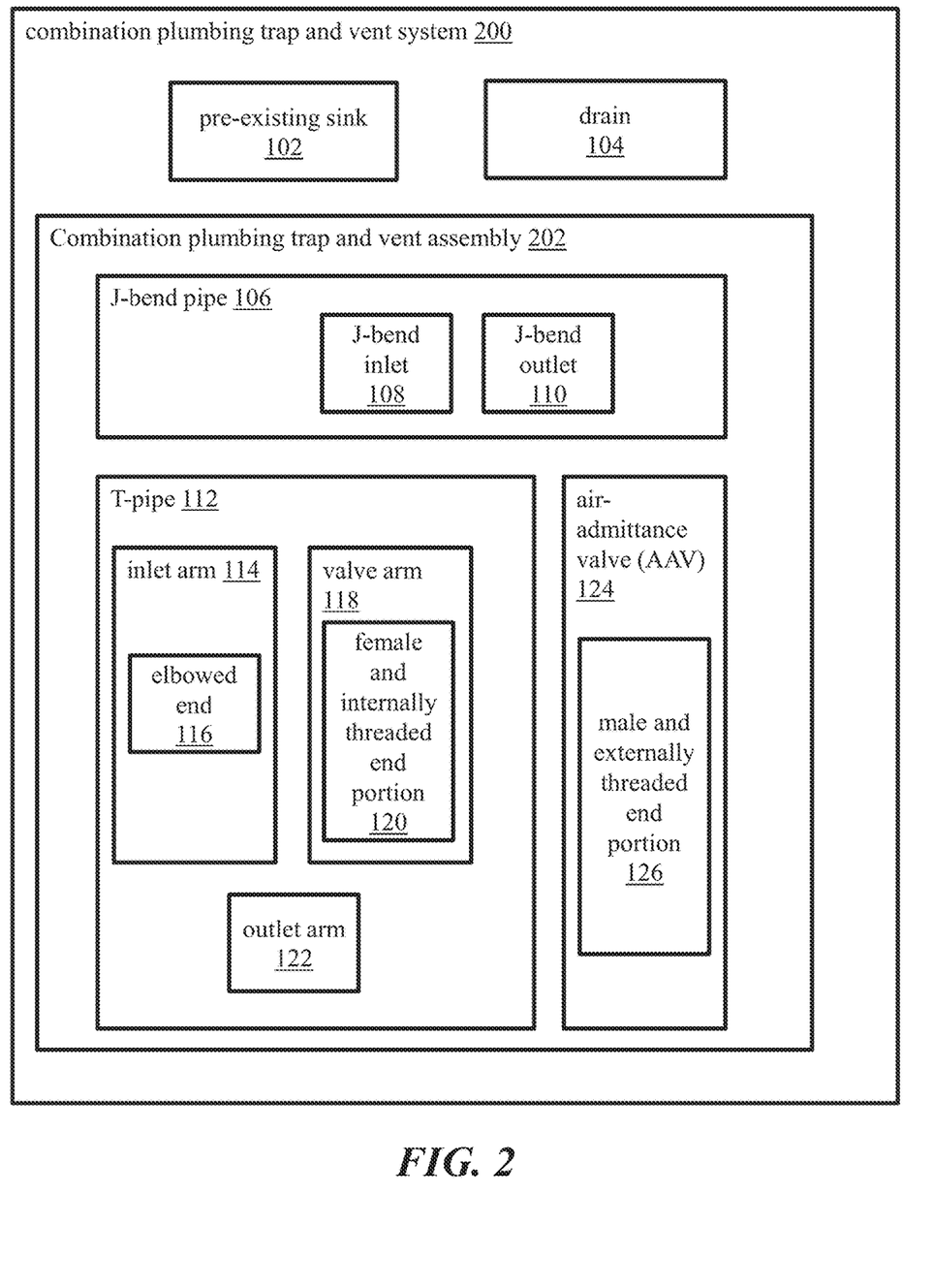
FIG. 2 is a block diagram illustrating a combination plumbing trap and vent system, according to some embodiments of the present disclosure.

As shown in FIG. 2, the present disclosure may also include a combination plumbing trap and vent system 200. The system 200 may include a pre-existing sink 102 and a drain 104 of a location in which the pre-existing sink 102 may be installed. This configuration allows the system 200 to be integrated with existing plumbing fixtures, making it suitable for renovation projects or upgrades to existing plumbing systems.

The system 200 may also include a combination plumbing trap and vent assembly 202 and vent assembly 202 in communication with the pre-existing sink 102 and the drain 104. This assembly 202 may serve as the foundation of the system 200, providing both the trapping function to militate against sewer gases from entering the living space and the venting function to maintain proper pressure within the plumbing system.

In a non-limiting example, the combination plumbing trap and vent assembly 202 and vent assembly 202 may be installed to address both the trapping and venting needs of a renovated bathroom or kitchen. The assembly 202 may connect to the pre-existing sink 102, effectively militating against sewer gases from entering the room while also ensuring proper pressure balance within the plumbing system. This solution may be particularly beneficial in situations where adding traditional roof vents would be impractical or cost-prohibitive.

The combination plumbing trap and vent assembly 202 and vent assembly 202 may include a J-bend pipe 106 having a J-bend inlet 108 and a J-bend outlet 110. The J-bend inlet 108 of the J-bend pipe 106 may be attached to the sink 102, providing a direct connection between the sink and the plumbing system. This configuration maintains the water seal necessary to militate against sewer gases from entering the living space.

The assembly 202 may also include a T-pipe 112 having an inlet arm 114 with an elbowed end 116, a valve arm 118, and an outlet arm 122. The J-bend outlet 110 of the J-bend pipe 106 may be attached to the elbowed end 116 of the inlet arm 114 of the T-pipe 112, creating a continuous pathway for water flow. This configuration allows for efficient drainage while maintaining the necessary trapping function.

It should be appreciated that the elbowed end 116 of the T-pipe does not have a length of straight pipe, which would otherwise be present in a P-trap arrangement. Instead, the elbowed end 116 of the T-pipe 112 has a curvature along substantially an entire length L of the elbowed end 116, for example, as shown in FIG. 5. It is believed that this curvature advantageously permits for the formation of the S-trap arrangement, and accommodates for an upgrading of an existing S-Trap arrangement beneath an existing sink without resorting to the P-trap arrangement that would require a length of straight pipe, which may be difficult to accomplish depending on the volume of the space within which the plumber is working, for example.

Furthermore, it should be appreciated that each of the valve arm 118 and the outlet arm 122 may consist of lengths of substantially straight pipe, unlike the curvature presented by the T-pipe 112. Moreover, in a particular embodiment as shown in FIG. 5, the valve arm 118 and the outlet arm 122 may be coaxial, and in a most particular embodiment are both arranged on an vertical axis X. The vertical axis X is spaced apart from and may be substantially parallel with a sink axis Y (also shown in FIG. 5) with which the sink drain is aligned.

Without being bound by any particular theory, it is believed that this arrangement of at least one of the curvature along substantially the entire length L of the elbowed end 116 of the T-pipe 112, and the coaxial alignment of the valve arm 118 and the outlet arm 122 of the T-pipe 112, permits for an optimum use of available volume in most sink installation locations, particularly when adapting, upgrading, or replacing pre-existing sink S-traps according to the present disclosure.

With renewed reference to FIG. 2, the valve arm 118 of the T-pipe 112 may include a female and internally threaded end portion 120. This end portion 120 may be designed to receive the male and externally threaded end portion of the AAV 124. The compatibility between these components ensures a secure connection and proper functioning of the venting system.

The outlet arm 122 of the T-pipe 112 may be in communication with and attached to the drain 104, completing the drainage pathway. This configuration allows for efficient removal of wastewater while maintaining the necessary venting and trapping functions. The integration of these components creates a comprehensive plumbing solution that addresses both drainage and venting needs.

In one embodiment, the AAV 124 may be located a distance or height H (shown in FIG. 5) at least four (4) inches above a bottommost portion of the J-bend pipe 106, more particularly at least eight (8) inches above, and most particularly at least twelve (12) inches above the bottommost portion. This configuration ensures proper functioning of the AAV by maintaining an adequate vertical distance from the drain, allowing for efficient air intake and militating against potential backflow issues. If needed to achieve this, it should be appreciated that an extension piece can be added to the tail piece of the sink drain. Although at least four (4) inches above a bottommost portion of the J-bend pipe is believed to be sufficient, one of skill in the art may also select other suitable relative locations for the AAV 124 within the scope of the present disclosure and depending on the context within which the AAV 124 is employed.

In another embodiment, the system 200 may incorporate polytetrafluoroethylene (PTFE)) tape disposed between the female and internally threaded portion of the valve arm of the T-pipe and the male and externally threaded end portion of the AAV. The use of PTFE tape provides a secure, leak-proof seal while preserving the integrity of the components and maintaining the manufacturer's warranty.

The system 200 may also include at least one of plumber putty, a rubber or plastic gasket, or PTFE tape disposed between the J-bend outlet and the elbowed end of the T-pipe. These sealing materials ensure a watertight connection between the components, militating against leaks and maintaining the overall efficiency of the plumbing system.

In some installations, the AAV 124 may be disposed within a cabinet beneath the pre-existing sink. This placement allows for easy access for maintenance while keeping the AAV protected and out of sight, maintaining the aesthetic appeal of the installation.

Figure 3:
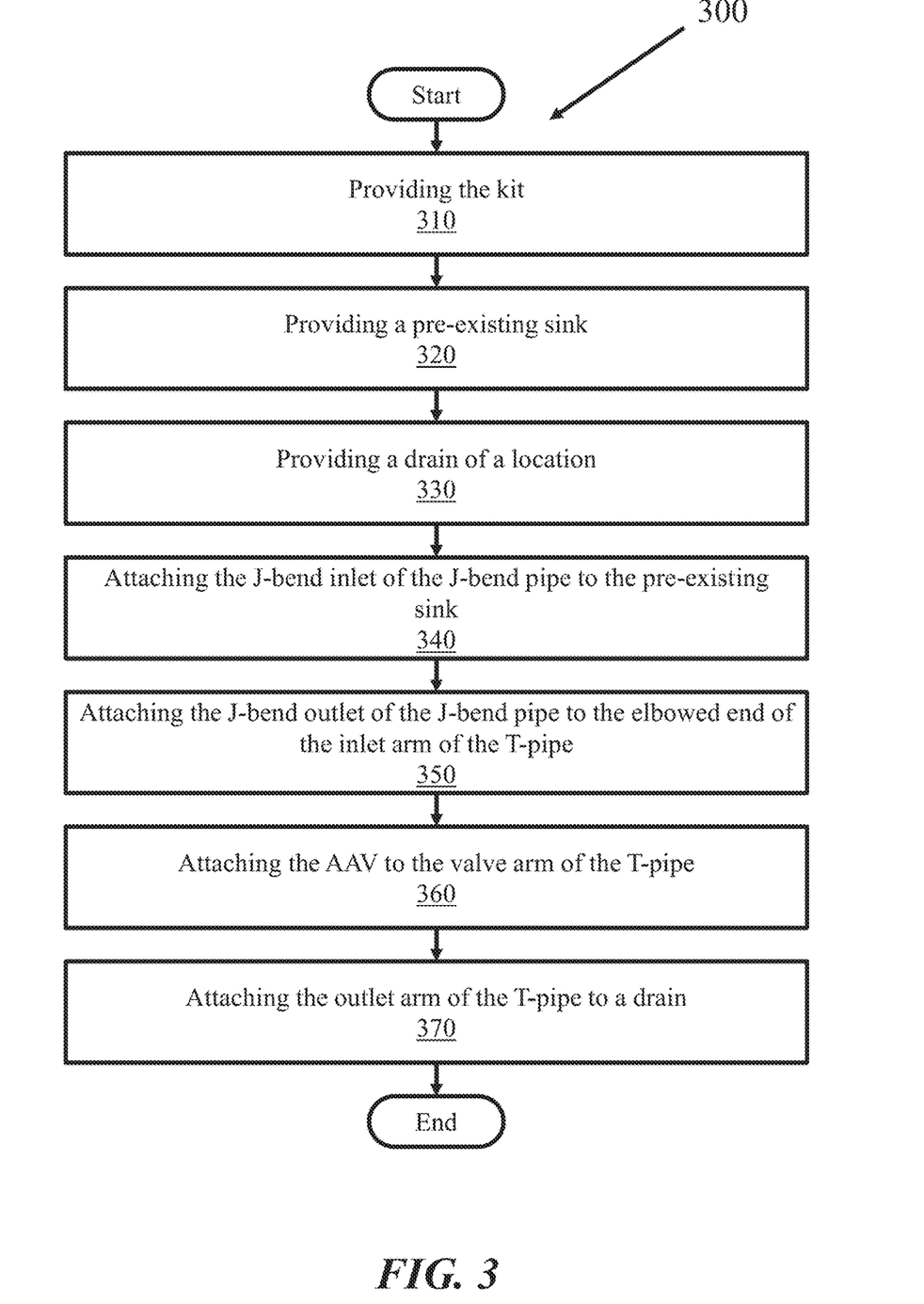
FIG. 3 is a flowchart illustrating a method of installing a combination plumbing trap and vent system, according to some embodiments of the present disclosure.

As shown in FIG. 3, embodiments of the present disclosure may also include a method 300 of installing a combination plumbing trap and vent system. The method 300 may include a step 310 of providing the kit 100 as described in previous embodiments. This kit 100 may include a J-bend pipe 106 having a J-bend inlet 108 and a J-bend outlet 110, a T-pipe 112 having an inlet arm 114 with an elbowed end 116, a valve arm 118, and an outlet arm 122, and an air-admittance valve 124 (AAV).

As an illustrative example, consider a DIY homeowner undertaking a kitchen sink replacement project. The method 300 may begin with the homeowner obtaining the kit 100 from a local hardware store. This kit 100 may come complete with all necessary components, including the J-bend pipe 106, T-pipe 112, and AAV 124, along with a detailed installation instructions set 128, for example, as shown in FIG. 1. The provision of a complete kit may simplify the process for the homeowner, ensuring they have all required parts and reducing the likelihood of purchasing incompatible components.

Returning to FIG. 3, the method 300 may also include a step 320 providing a pre-existing sink 102. This step acknowledges that the system may be installed in homes or buildings with existing plumbing fixtures, making it suitable for renovation projects or upgrades to existing plumbing systems. The method 300 may further include a step 330 providing a drain 104 of a location in which the pre-existing sink 102 may be installed.

In a non-limiting example, consider a bathroom remodeling project in an older home. The method 300 may involve working with a pre-existing pedestal sink 102 that the homeowner wishes to keep for its vintage aesthetic. The plumber may need to carefully assess the existing drain 104 location and condition to ensure compatibility with the new plumbing system. This step may involve inspecting the drain pipe for any damage or corrosion and potentially making minor adjustments to accommodate the new combination plumbing trap and vent system while preserving the original sink and drain location.

The method 300 may include a step 340 of attaching the J-bend inlet 108 of the J-bend pipe 106 to the pre-existing sink 102. This step establishes the connection between the sink and the new plumbing assembly, ensuring proper drainage from the sink into the plumbing system. The attachment of the J-bend pipe 106 to the sink 102 may also help maintain the water seal necessary to militate against sewer gases from entering the living space.

As an illustrative example, in a kitchen renovation project, a plumber may begin the installation process by carefully attaching the J-bend inlet 108 of the J-bend pipe 106 to the drain opening of a newly installed farmhouse sink 102. The plumber may use plumbers' putty or a rubber or plastic gasket to create a watertight seal between the J-bend inlet 108 and the sink drain. This careful attachment process may ensure that water flows smoothly from the sink into the J-bend pipe 106 while also creating an effective barrier against sewer gases, which is particularly important in a kitchen environment where food preparation occurs.

The method 300 may also include a step 350 of attaching the J-bend outlet 110 of the J-bend pipe 106 to the elbowed end 116 of the inlet arm 114 of the T-pipe 112, creating a continuous pathway for water flow. This connection ensures that water from the sink can flow smoothly into the T-pipe 112 and eventually to the drain. The elbowed end 116 of the inlet arm 114 may help maintain the proper orientation of the T-pipe 112 within the plumbing system.

The method 300 may further include a step 360 of attaching the AAV 124 to the valve arm 118 of the T-pipe 112. The step 360 may include an attaching of the AAV to the valve arm of the T-pipe by threading the male and externally threaded end portion of the AAV into the female and internally threaded end of the valve arm of the T-pipe, for example. This secure connection method ensures proper alignment and sealing of the components. This step also ensures proper venting of the plumbing system, allowing air to enter when needed and militating against the formation of a vacuum that could impede drainage. The attachment of the AAV 124 may be helpful for maintaining the efficiency and proper functioning of the plumbing system.

As an illustrative example, in a basement bathroom installation where traditional roof venting is not feasible, the plumber may carefully thread the AAV 124 onto the valve arm 118 of the T-pipe 112. The plumber may use Teflon tape 130, which may be provided as part of the kit 100 (shown in FIG. 1) or separately, on the threads to ensure a tight, leak-proof seal. Once installed, the AAV 124 may automatically open to allow air into the system when water is draining, militating against the gurgling sounds and slow drainage often associated with poorly vented plumbing systems. This step may be particularly helpful in basement installations where proper venting can be challenging due to the below-grade location.

The method 300 may also include a step 370 of attaching the outlet arm 122 of the T-pipe 112 to the drain 104, completing the installation of the plumbing assembly. This final connection ensures that wastewater can be efficiently removed from the system. The proper attachment of the outlet arm 122 to the drain 104 may be important for militating against leaks and ensuring the overall integrity of the plumbing system.

In a non-limiting example, consider the final step of installing a new laundry room sink. The plumber may carefully align the outlet arm 122 of the T-pipe 112 with the existing pipe of the drain 104 in the wall. Using appropriate fittings and pipe cement, the plumber may securely connect the outlet arm 122 to the drain 104, ensuring a proper slope for efficient water flow. The plumber may then test the entire system by running water through the sink and checking for any leaks or drainage issues. This final step may complete the installation process, providing the laundry room with a fully functional and properly vented sink that can handle the high water volume typically associated with laundry activities.

Additionally, the method 300 of installation may include a step (not shown) of disposing PTFE tape between the female and internally threaded portion of the valve arm of the T-pipe and the male and externally threaded end portion of the AAV. This extra sealing measure helps militate against leaks and ensures a long-lasting, reliable connection between the AAV and the T-pipe.

Advantageously, the combination plumbing trap and vent kit, system, and method of the present disclosure provide an innovative solution to the challenges associated with traditional plumbing venting systems. By incorporating an air admittance valve (AAV) into a compact and easily installable assembly, this disclosure addresses the issues of complex pipe routing, multiple roof penetrations, and the limitations of conventional S-traps. It should be appreciated that the kit is particularly adapted for replacing S-traps, and not for replacement of P-traps. The gravity-operated AAV allows for proper venting without the need for extensive vent piping, reducing installation complexity and costs while maintaining efficient drainage and militating against sewer gas intrusion.

This system is particularly beneficial in situations where traditional roof venting is impractical or costly, such as in kitchen islands, basement bathrooms, or during renovation projects where adding new vent lines may be challenging. Furthermore, the standardized components and pre-assembled options facilitate easy installation and replacement, making it accessible for both professional plumbers and DIY enthusiasts. By addressing these long-standing issues in plumbing design and installation, the disclosure offers a versatile, efficient, and cost-effective alternative to conventional venting methods, ultimately improving the overall performance and safety of residential and commercial plumbing systems.

EXAMPLES

Figure 4:
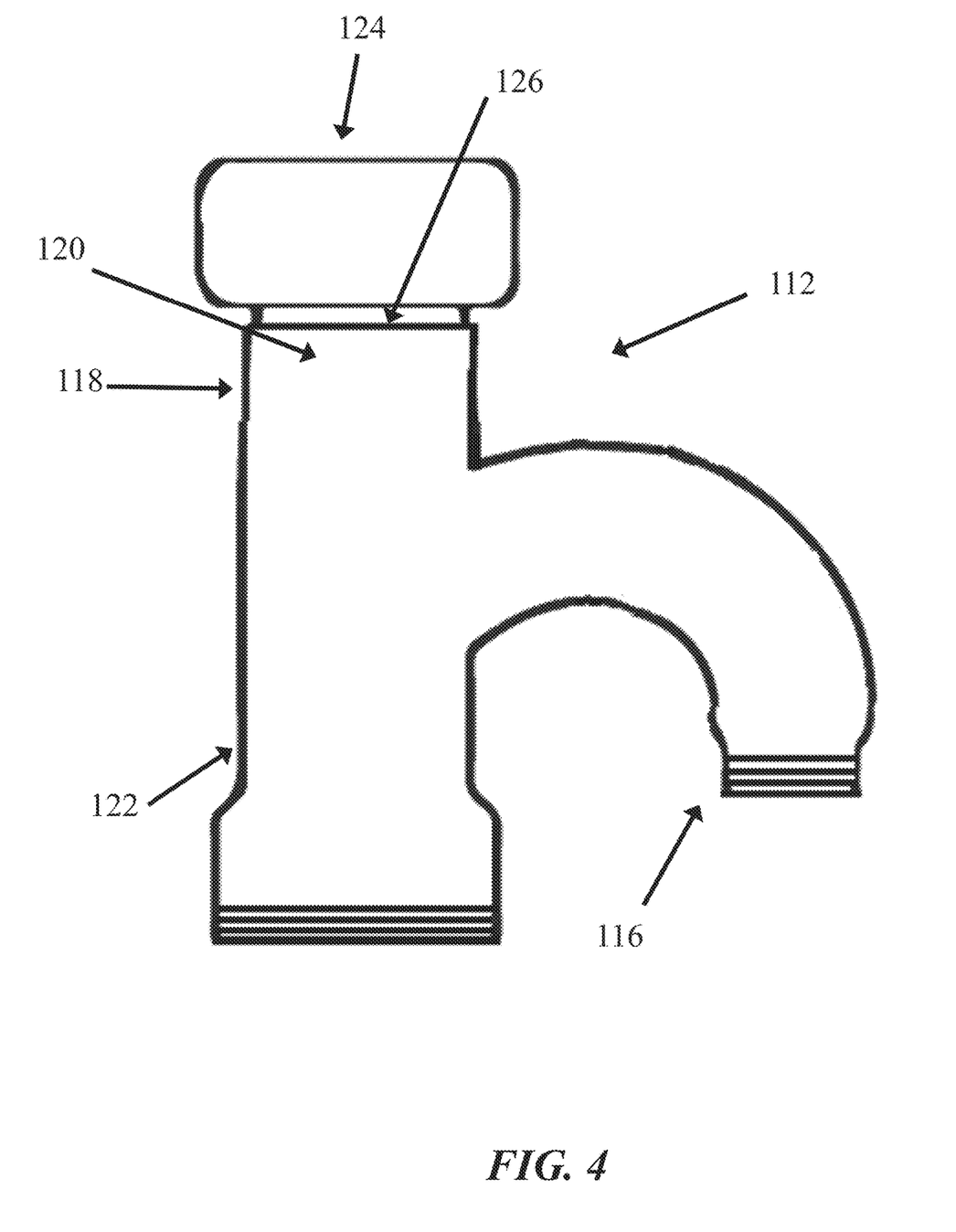
FIG. 4 is a side elevational view of a T-pipe with an elbowed end adapted for formation of an S-trap, and configured for use in a combination plumping trap and vent system according to one embodiment of the present disclosure.
Figure 6:
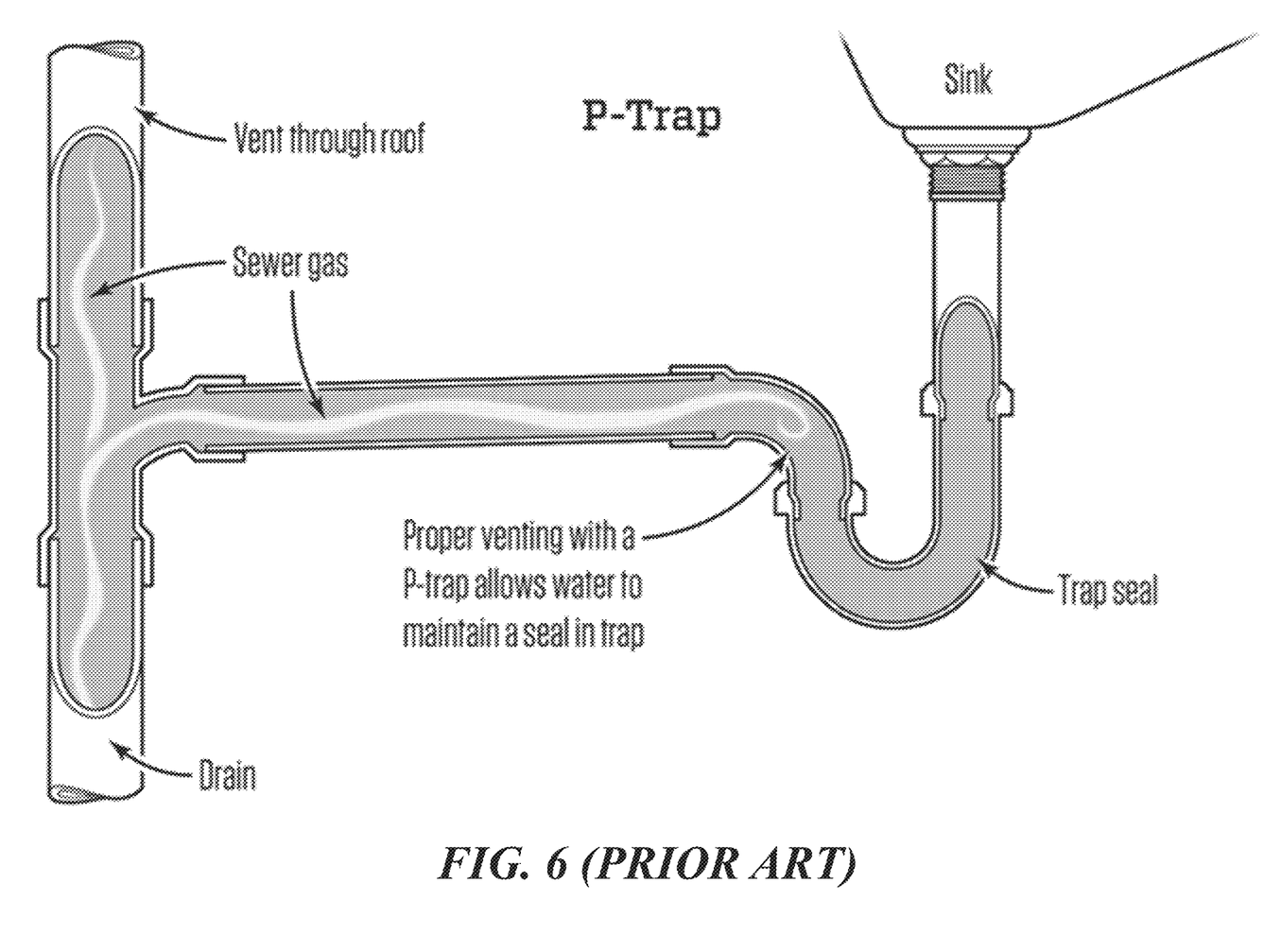
FIG. 6 is a side elevational view of a P-trap arrangement for a plumbing trap assembly of the prior art.
Figure 7:
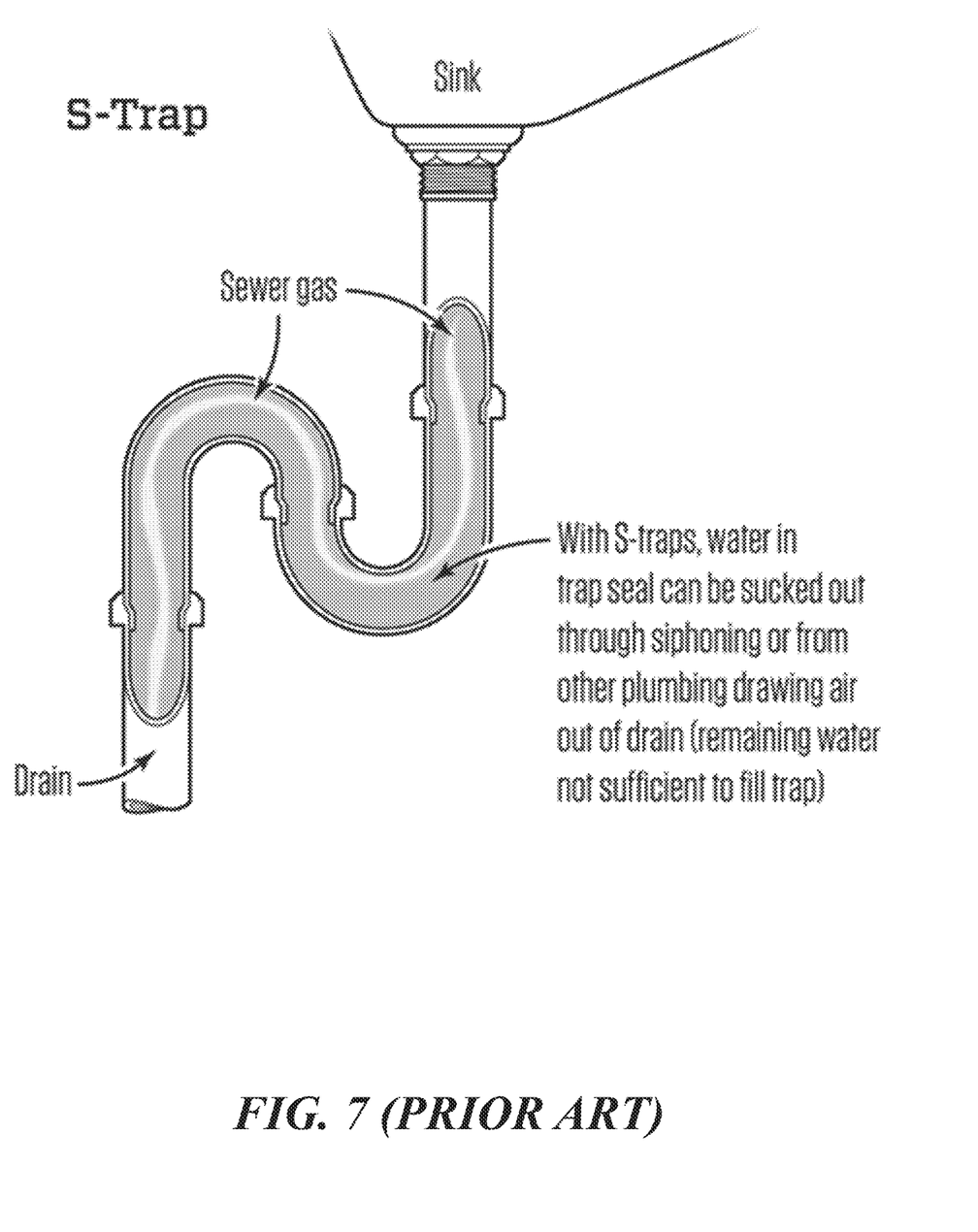
FIG. 7 is a side elevational view of an S-trap arrangement for a plumbing trap assembly of the prior art.

Example embodiments of the present technology are provided with reference to the several figures enclosed herewith, including FIGS. 4 and 5, with the prior art P-traps and S-traps illustrated in FIGS. 6 and 7 for convenience in comparison.

Example 1: Kitchen Island Sink Installation

In this example, the combination plumbing trap and vent kit 100 is used to install a new sink in a kitchen island during a home renovation project. The homeowner wants to add a sink to their kitchen island but faces challenges with traditional venting due to the island's location away from exterior walls.

The plumber begins by attaching the J-bend inlet 108 of the J-bend pipe 106 to the newly installed kitchen sink drain. The J-bend outlet 110 is then connected to the elbowed end 116 of the inlet arm 114 of the T-pipe 112. This configuration allows for proper drainage while maintaining the necessary trap seal to militate against sewer gases from entering the kitchen.

Next, the plumber attaches the air-admittance valve (AAV) 124 to the valve arm 118 of the T-pipe 112. The standardized 1½ inch dimensions of both the male end portion 126 of the AAV 124 and the female end portion 120 of the valve arm 118 ensure a secure and leak-proof connection. Finally, the outlet arm 122 of the T-pipe 112 is connected to the existing drain pipe in the floor beneath the kitchen island. This installation provides proper venting for the island sink without the need for complex and costly traditional vent piping through the roof, such as would be required by the P-trap arrangement as shown in FIG. 6.

Example 2: Basement Bathroom Renovation

In this example, the combination plumbing trap and vent system 200 is used to renovate an existing basement bathroom with poor drainage and venting issues. The homeowner wants to improve the functionality of the bathroom without extensive modifications to the existing plumbing infrastructure.

The plumber starts by removing the old S-trap, e.g., as shown in FIG. 7, from the existing sink 102. The J-bend inlet 108 of the J-bend pipe 106 is then attached to the sink drain. The J-bend outlet 110 is connected to the elbowed end 116 of the inlet arm 114 of the T-pipe 112. This configuration maintains the necessary water seal while improving drainage efficiency.

The air-admittance valve (AAV) 124 is then installed on the valve arm 118 of the T-pipe 112. The AAV 124 allows air to enter the system when needed, militating against the formation of a vacuum and improving drainage performance. The outlet arm 122 of the T-pipe 112 is connected to the existing drain 104 in the basement floor. This installation addresses the venting issues common in basement plumbing without the need for extensive modifications or additional roof penetrations.

Example 3: Multi-Story Apartment Building Plumbing Upgrade

In this example, the combination plumbing trap and vent kit 100 is used to upgrade the plumbing systems in a multi-story apartment building. The building manager wants to improve the overall plumbing performance and reduce maintenance issues related to poor venting.

The plumbing team starts by installing the kit 100 in each apartment's bathroom and kitchen sinks. The J-bend pipe 106 is attached to each sink, with the J-bend outlet 110 connected to the elbowed end 116 of the T-pipe 112. The standardized components allow for quick and consistent installation across all units.

The air-admittance valve (AAV) 124 is then installed on the valve arm 118 of each T-pipe 112. The AAV 124 is configured to open in response to negative pressure created by draining water, allowing air to enter the system and militate against the formation of vacuums. This is particularly beneficial during peak usage times when multiple residents are using water simultaneously. The outlet arm 122 of each T-pipe 112 is connected to the building's main drain stack.

This upgrade significantly improves the plumbing performance across the entire building, regardless of whether a P-trap arrangement (FIG. 6) or an S-trap arrangement (FIG. 7) was previously in use. The AAVs 124 provide proper venting for each fixture without the need for additional roof penetrations, reducing maintenance issues and improving the building's overall energy efficiency. The standardized components also simplify future maintenance and replacements, reducing long-term costs for the building management.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of installing a combination plumbing trap and vent system for replacement of an S-trap in a pre-existing sink, the method comprising steps of:

providing a combination plumbing trap and vent kit, including
a J-bend pipe having a J-bend inlet and a J-bend outlet,
an air-admittance valve having a male and externally threaded end portion,
a T-pipe having an inlet arm with an elbowed end, a valve arm, and an outlet arm, the valve arm having a female and internally threaded end portion, wherein the elbowed end of the T-pipe has a curvature along substantially an entire length of the elbowed end and does not have a length of straight pipe, and wherein the female and internally threaded end portion of the valve arm of the T-pipe is configured to receive the male and externally threaded end portion of the air-admittance valve, and wherein the outlet arm and the valve arm are coaxial and arranged on a first axis, and the elbowed end is arranged on a second axis that is spaced apart from and parallel with the first axis, and
an instruction set providing guidance on installing the J-bend pipe, T-pipe, and air-admittance valve to form a combination plumbing trap and vent assembly for use with the pre-existing sink;

providing the pre-existing sink with the S-trap;
providing a drain of a location in which the pre-existing sink is installed;
attaching the J-bend inlet of the J-bend pipe to the pre-existing sink, wherein the J-bend outlet of the J-bend pipe is oriented upwardly;
attaching the J-bend outlet of the J-bend pipe to the elbowed end of the inlet arm of the T-pipe, wherein the elbowed end of the inlet arm of the T-pipe is oriented downwardly;

attaching the air-admittance valve to the valve arm of the T-pipe; and attaching the outlet arm of the T-pipe to the drain, wherein the combination plumbing trap and vent assembly is provided in communication with the pre-existing sink and the drain.

2. The method of claim 1, wherein the step of attaching the air-admittance valve to the valve arm of the T-pipe comprises a step of threading the male and externally threaded end portion of the air-admittance valve into the female and internally threaded end portion of the valve arm of the T-pipe.

3. The method of claim 1, further comprising a step of disposing at least one of plumbers putty, a rubber or plastic gasket, and a PTFE tape between the female and internally threaded end portion of the valve arm of the T-pipe and the male and externally threaded end portion of the air-admittance valve.

4. A method of installing a combination plumbing trap and vent system for replacement of an S-trap in a pre-existing sink, the method comprising steps of:

providing a combination plumbing trap and vent kit, including a T-pipe having an inlet arm with an elbowed end, a valve arm, and an outlet arm, the valve arm having a female and internally threaded end portion, wherein the elbowed end of the T-pipe has a curvature along substantially an entire length of the elbowed end and does not have a length of straight pipe, and wherein the female and internally threaded end portion of the valve arm of the T-pipe is configured to receive a male and externally threaded end portion of an air-admittance valve, and wherein the outlet arm and the valve arm are coaxial and arranged on a first axis, and the elbowed end is arranged on a second axis that is spaced apart from and parallel with the first axis, and an instruction set providing guidance on installing the J-bend pipe, T-pipe, and air-admittance valve to form a combination plumbing trap and vent assembly for use with a pre-existing sink;

providing the pre-existing sink with the S-trap;

providing a drain of a location in which the pre-existing sink is installed;

attaching a J-bend inlet of a J-bend pipe to the pre-existing sink, wherein the J-bend outlet of the J-bend pipe is oriented upwardly;

attaching the J-bend outlet of the J-bend pipe to the elbowed end of the inlet arm of the T-pipe, wherein the elbowed end of the inlet arm of the T-pipe is oriented downwardly;

attaching the air-admittance valve to the valve arm of the T-pipe; and attaching the outlet arm of the T-pipe to the drain, wherein the combination plumbing trap and vent assembly is provided in communication with the pre-existing sink and the drain.

5. The method of claim 4, further comprising a step of providing the J-bend pipe separately from the combination plumbing trap and vent kit.

6. The method of claim 4, further comprising a step of providing the air-admittance valve separately from the combination plumbing trap and vent kit.

\* \* \* \* \*